(12) United States Patent
Harmon et al.

(10) Patent No.: US 7,917,848 B2
(45) Date of Patent: Mar. 29, 2011

(54) ONLINE PUBLISHING TOOLS

(75) Inventors: Neal S. Harmon, Lehi, UT (US);
Joseph N. Oster, Santa Cruz, CA (US)

(73) Assignee: Family Learn LLC, Provo, UT (US)

( * ) Notice: Subject to any disclaimer, the term of this patent is extended or adjusted under 35 U.S.C. 154(b) by 1112 days.

(21) Appl. No.: 11/424,218

(22) Filed: Jun. 14, 2006
(Under 37 CFR 1.47)

(65) Prior Publication Data

US 2007/0291297 A1 Dec. 20, 2007

(51) Int. Cl.
*G06F 17/24* (2006.01)
*G06F 3/048* (2006.01)
*G06F 3/12* (2006.01)
*G06K 15/02* (2006.01)

(52) U.S. Cl. ........... 715/253; 715/769; 358/1.1; 358/1.2

(58) Field of Classification Search .................. 358/1.15, 358/1.1, 1.2; 715/253, 769
See application file for complete search history.

(56) References Cited

U.S. PATENT DOCUMENTS 4,792,919 A * 12/1988 Fukunaga ..................... 715/207
5,353,222 A * 10/1994 Takise et al. .................. 715/205

OTHER PUBLICATIONS

PowerPoint 2003 Personal Trainer. Sebastopol, CA: O'Reilly Media, Inc., 2004. Print.*

* cited by examiner

*Primary Examiner* — Benny Q Tieu
*Assistant Examiner* — Eric A Rust
(74) *Attorney, Agent, or Firm* — Workman Nydegger

(57) ABSTRACT

Online publishing tools, which provide browser-based publishing services available through the Internet for preparing content for publication, include a preview interface which generates and displays an accurate representation of the client's work, with proportionately correct size, font, format and positioning, as well as an edit interface which generates a less precise but editable version of the client's work. Preview files used for displaying previews on the preview interface, and which can incorporate edits made on the edit interface, include typesetting information, positioning information, hot zones information, images of text and links to omitted content. Some preview files provide preview information for less than the client's entire document that is being worked on. Interfaces are also used to move and modify sections of content contained in the body of the client's work, of any size, through simple drag and drop processes implemented on elements of a corresponding table of contents.

12 Claims, 6 Drawing Sheets

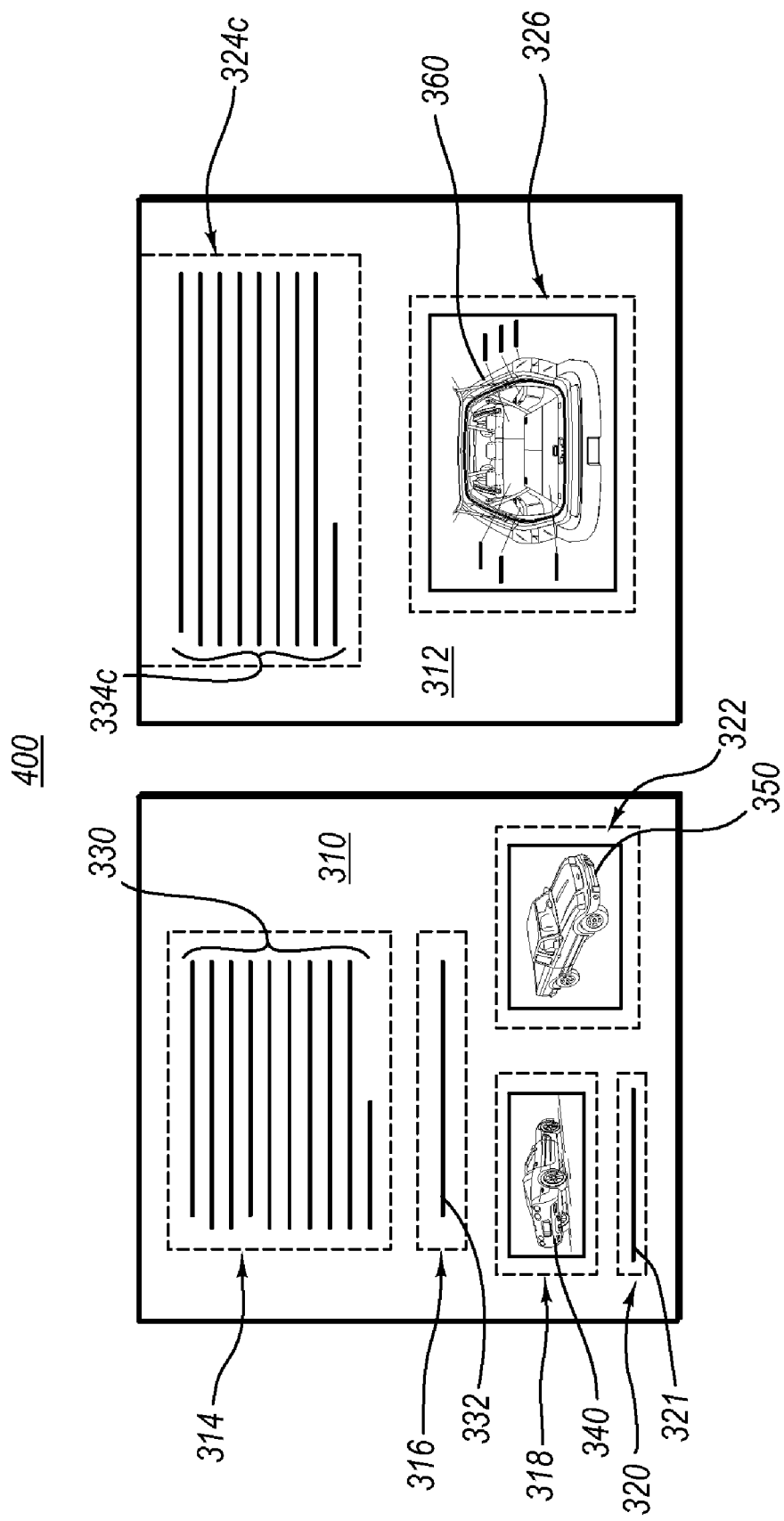

ONLINE PUBLISHING TOOLS

CROSS-REFERENCE TO RELATED APPLICATIONS

N/A

BACKGROUND

The present invention is generally directed to Online and browser-based publishing of documents, books, and other personal works.

Many consumers have entertained the idea of publishing personal works for limited use and distribution. There are many compelling reasons for doing this. Some personal works, for example, are directed to honoring a cherished family member or memorializing a personal history. Publishing a creative story, novel or portfolio can also be quite rewarding. Small businesses and educators have also found published books to be an excellent way to promote their own products and ideas to a target audience.

Although the industry has made valiant attempts at meeting this increased demand for individualized publishing, there are still many obstacles that prevent the individual consumer and small entity from publishing their own works. In fact, the complexities and costs associated with publishing can be quite prohibitive.

In the past, it was relatively expensive to professionally publish individual and small quantities of a work because professional publishing required the assistance of the large presses which are associated with high overhead and are not nimble enough to print only a few books at an affordable price. Recent developments in the printing technologies and machinery, however, have enabled professional printing from small operations, and such that it is now possible to obtain professional printing for even small quantity print jobs at relatively affordable price point.

Although there are now many businesses set up to help the consumer publish their own personal works, it can still be difficult for the consumer to find and engage these businesses. For at least this reason, many publishing companies have started to provide Online or browser-based publishing services through the Internet.

Notwithstanding the foregoing, many consumers are still discouraged in their attempts to publish their personal works because they have found the publishing process to be too complex and cumbersome. In particular, the process of laying out the text and graphics to be printed in an appropriate format can be very tedious and difficult. Although software publishing interfaces and other such tools are designed to help the consumer, they are often inadequate and too slow.

One problem with existing software interfaces is that they are unable to accurately render a print preview of the work to be published. For example, existing browsers modify the size, positioning and fonts of the text and images that are generated by the publishing applications in order to facilitate the browser-based rendering operations according to predefined rules of the browser. One reason for this is that some browsers may not have the appropriate font files for recognizing and rendering the original text in their native fonts.

Because the typesetting and font information received from a rich publishing application is not necessarily compatible with a client's standard browser, the client may not be able to see an accurate representation of their personal work while it is being worked on and viewed through their Internet browser. This can be very particularly frustrating when the consumer receives a published work that is different than the product they thought they created in the Online publishing service, and simply because the browser failed to provide an accurate representation of their work.

To compensate for the inadequacies mentioned above, many Online publishing services compile the client's submissions into a PDF or other image-type file, for review, which accurately reflects the actual fonts and formatting of the work. This file cannot be edited by the client for modifying the work, as it is only an image file, but it can be accessed by the client to see what their finished product will look like when it is printed.

If the client wants to make additional changes they will then need to go back to the browser-based window of the publishing application to make the changes that are anticipated to generate a desired result. However, the client cannot know what the ultimate consequence of their changes will be until a new PDF preview is generated because their anticipated changes are only made to a modified browser-based version of the actual work.

The publishing service will then re-typeset the work, with any modifications that are submitted, and generate a new corresponding PDF preview to send to the client for additional review. This process is iteratively repeated until the client is happy with the previewed product or until the client gets tired of making changes.

This iterative process of generating previews every time content is submitted or edited can be quite time consuming and is not very user friendly. In particular, the consumer can experience a relatively long delay between the time they make a change and the time it takes to get a new preview back. This latency is particularly noticeable when the work includes a lot of content that all has to be compiled each time a new preview is generated. Large files can also take a relatively long time to transmit and load.

This undesirable delay in obtaining a preview is particularly noticeable and frustrating when the client has only made relatively minor changes to their personal work, such as, for example, to a single page. Although the client expects that relatively minor changes will result in the receipt of a new preview in a shorter time than it would take to receive a new preview following significant changes, this is not necessarily true. In particular, the time it takes for the publishing service to re-typeset, compile and send a new preview to the client can actually take about the same amount of time, irrespective of whether the most recent changes were minor or significant. This is particularly true when considering that a significant percentage of the latency experienced by the consumer is the time it takes for the publishing service to resend the entire preview to the client, including all of the images in the work, even though the client had already received the images previously. If there are numerous images, the time it takes to transmit and load the compiled document for preview can be quite lengthy.

Even when the preview document sent to a user only includes one or two pages, the existing publishing applications still compile all of the color images along with the text to generate the preview file. This unnecessarily wastes processing and transmission resources during the iterative editing process. This is particularly true when considering that the client has already received the color images in a previous transmission.

Other problems experienced with Online publishing includes the difficulty in relocating sections of a work. Although some services provide interfaces for identifying and displaying sections of a work in an index or table of contents, existing systems do not provide an easy way to move the sections of content around. For example, when a client wants to move one section of content to another location, existing systems only let the client relocate one page of content at a time.

Currently, there are no services available in Online publishing for moving multiple pages in a work at one time and through manipulation of the corresponding table of contents. Accordingly, if a client determines that one or more entire sections need to be moved to different chapters or other locations in a work, the client is faced with the onerous and daunting task of having to move each page individually and to reformat the entire document. Such an endeavor is particularly daunting in view of the fact that the client is unaware of what the result of the changes will be to each change without first requesting for and loading a preview of the entire work, as previously discussed.

Existing systems are also somewhat limited in their flexibility for moving even a single page at a time. For example, a page cannot be relocated from one section to another section, by leap-frogging multiple intermediary pages, in a single operation. Instead, the page has to be repeatedly selected and moved past each intermediary page through a plurality of separate operations.

In view of the foregoing, there is clearly a need in the industry for improved Online publishing methods, interfaces and other publishing tools to improve the user convenience for individual and limited publication of personal works.

BRIEF SUMMARY

The present invention is directed to improved Online publishing tools, including, but not limited to improved methods, interfaces, computer program products and computing systems for facilitating Online publishing. While the benefits and advantages of the present invention over existing Online publishing services are particularly noticeable when a work is prepared for publication in limited quantities, it will be appreciate that the invention is also beneficial for and can be applicable to all types of publishing services.

This Summary is intended to introduce a selection of concepts in a simplified form that are further described in the Detailed Description below. This Summary is not intended to identify key features or essential features of the claimed subject matter, nor is it intended to be used as an aid in determining the scope of the claimed subject matter.

In some embodiments a client system uses browser-based publishing services available through the Internet to submit and modify content for publication. The interfaces available to the client system include a preview interface which generates and displays an accurate representation of the client's work, with proportionately correct size, font, format and positioning. This preview is generated in response to receiving a preview file which was generated by the publishing service typesetting the submitted content, generating positioning hot zones, generating images of text and generating data links to stored content. The preview is generated and displayed by rendering the images of the text, accessing stored images or other content from the links, merging the stored content with the images of the text and in the proper positioning, as defined by the positioning information and hot zones.

In some embodiments, the preview file corresponds to only a limited and incomplete portion of the document being worked on. For example, in some embodiments only a few pages that are displayed in the preview interface are sent in the preview file, thereby reducing the bandwidth requirements and processing load for transmitting and loading the preview file.

As the client navigates to a new preview page, a new preview page is generated and displayed, on demand, at the client and in the manner described above, by rendering the images of text in the appropriate hot zones and by accessing the linked images and by overlaying these linked images in the in the appropriate hot zones as defined by positioning information sent with the preview file. In some instances, navigation of the preview pages also includes receiving a new preview file corresponding to the new pages that are being navigated to.

In some embodiments, images and other content is omitted from the compiled preview file. In these embodiments, links to the images and content enable the client to identify and access the images through the preview file, even though they are not compiled with or sent in the preview file. Because the preview file can be sent without the images, the transmission and loading processes can be sped-up even more, thereby further reducing any latency experienced by the client.

If a client wants to modify the previewed document, the client selects a displayed portion of the document. The corresponding hot zone is identified and a request is made for the actual text or other data corresponding to the selected hot zone in an editable form. Once the data is received, a new window is provided for displaying the actual text and or images to be modified. Any modifications are sent to the publishing service for processing the requested modifications and for generating a new preview file that is sent to the client for additional review. Because the preview file sent to the client may include only a few pages or small portion of the entire preview document and because the preview file replaces many of the images with links, the preview file can be transmitted and rendered much more quickly than is currently possible with existing systems.

The document can also be worked on in a collaborative effort by receiving content and/or changes from various authorized parties at different periods of time.

Relocating chapters or other sections of content can also be performed quickly and efficiently according to the present invention. In some embodiments, the client relocates content through an interface displaying the corresponding table of contents. For example, sections of content (which correspond to the elements of the table of contents) can be relocated by selecting and moving the elements of the table of contents with a drag and drop type functionality. The corresponding content in the document, which is associated with the selected elements of the table of contents, is correspondingly and automatically relocated in response to changes made to the table of contents. Means for providing appropriate reformatting of the elements in the table of contents and in the working document are also provided.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates one embodiment of the displayed preview shown in FIG. 3 after modifications have been made to the displayed content;

DETAILED DESCRIPTION

Figure 1:
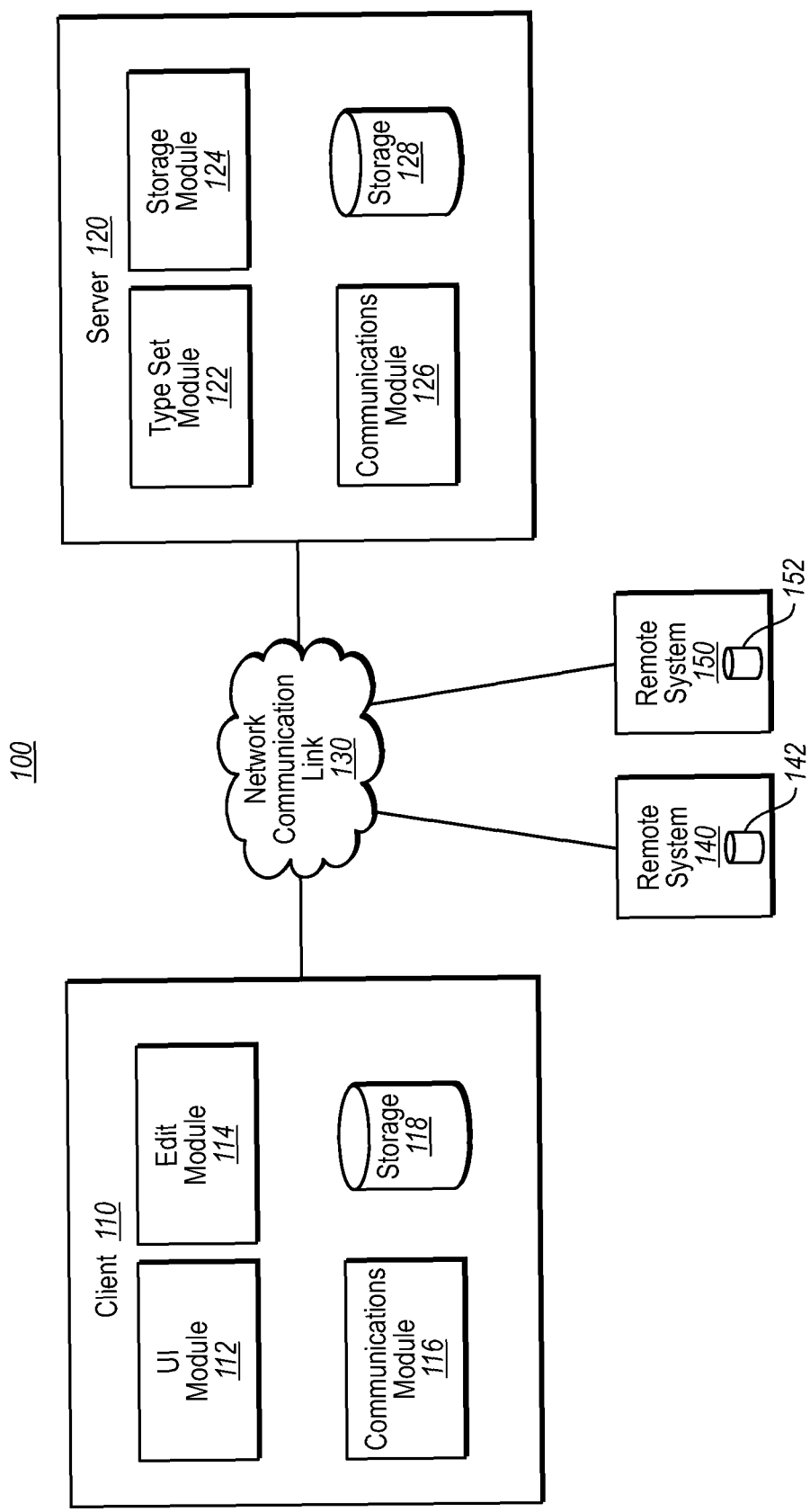
FIG. 1 illustrates one embodiment of a computing network environment that includes a client system in communication with a server system.

The present invention extends to methods, interfaces, computer program products and computing systems, all of which are referred to as tools, for facilitating Online or browser-based publishing.

In some embodiments, a client system uses publishing services available through the Internet to submit and modify content for publication. The interfaces available to the client system include a preview interface for previewing an accurate representation of how the content is formatted by the publishing application or service. The content is rendered through the preview interface with proper proportional placement with regard to the other content, and as dictated by positioning information included in the corresponding preview file.

In some embodiments, the preview file that is sent to the client corresponds to less than the entire contents of the client document being worked on. Images and other content can be omitted and referenced by links to the content. The client system can then directly or remotely access the linked content when it identifies and processes the links, and as needed. When the stored content is located at the client, such as in cache, the client can receive and render the preview file much more quickly than when the preview includes all of the content. When the client navigates to new pages of the document, new content and or preview files can be accessed and rendered on demand and as described above, by rendering the images of text in the appropriate hot zones and by accessing the linked images or other content and by overlaying the linked content in the appropriate hot zones as defined by positioning information sent with the preview file.

If a client wants to modify the previewed document, the client selects a displayed portion of the document. The corresponding hot zone is identified and a request is made to a repository or the server for the relevant text or other data corresponding to the selected hot zone. Once the data is received, a new window is provided for displaying the actual text and or images to be modified. The modification is then sent to the server which processes the requested modifications and generates one or more new preview files that are sent to the client for additional review. In some embodiments, the data that is selected for editing, including images and other data, is stored at the client, such that it be accessed and displayed in the new edit window without first making a special request for the data from the server. This way, when a hot zone is selected, the client system can identify and display the relevant data it has access to in the edit window.

To make significant changes, such as moving chapters or other sections of content, the client can use a table of contents interface. In some embodiments, elements of the table of contents are associated with identifiers corresponding to the content within the body of the document. As elements are selected and moved within the table of contents, the corresponding content is moved within the document. The relocated elements from the table of contents and the correspondingly relocated content can also be reformatted with new identifiers, fonts and other formatting to promote consistency in the hierarchal structure of the document and table of contents.

Some embodiments of the present invention comprise one or more special purpose or general-purpose computers, including various computer hardware, as discussed in greater detail below with regard to the client system, server system and third party systems.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Computer-executable instructions are also sometimes referred to herein as modules. Many of the computer-executable instructions are also embodied as applets, scripts, executables or other programs that can be transmitted between the computing systems described below.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

To help aid a better understanding and interpretation of the scope of the application, certain terms will now be defined.

The term "personal work" generally refers to any combination of one or more documents, text, images or other content that is accessed, submitted or edited by a user for publication. Although publication may include physical printing of the personal work into a hardbound book, publication can also include other forms of reproduction known to those of skill in the art, including, but not limited to, softbound books, magazines, pamphlets, cards, electronic distribution through email, file transfer, and so forth. The term "personal work" is sometimes used interchangeably in this application with the terms 'work', 'working file', 'document' and 'content,' even though a plurality of documents and content can also be included within a single work.

The reference to "image of text" should be interpreted as an image file, formatted in a JPEG, PNG, GIF or any other image format that is capable of accurately storing and rendering the fonts and positions of text contained in the file. For example, the image files should also be broadly interpreted as any file that is capable of accurately storing and rendering the fonts and positions of text and even when the file is rendered through a browser that does not recognize or have the font information needed to generate the fonts of the text independently or that includes positioning rules that would otherwise modify or reposition the text contained within the file in a disproportionate or non-linear way with respect to the other text contained within the file or with respect to the document page size that the text is located on when the image file is created. Although not necessary in all embodiments, the image of text can also correspond to a file that represents text in a format that does not permit the text to be edited in a manner that is compatible with typical word processors.

The term "table of contents" should be broadly interpreted as virtually any index or visual hierarchy that defines an order of corresponding data found within a document.

Although the term "server" and "client" can denote fixed relationship between computing systems in which the server provides services to the client, it will be appreciated that the present application does not require such a formal or fixed relationship. Instead, the terms 'server' and 'client' are used in this application for convenience of description, inasmuch as all of the computing systems referred to in this application can operate at disparate times as a traditional server as well as a traditional client. It will also be appreciated that the client and server systems described herein, as well as the remote third party systems, can be stand-alone computing systems or distributed networks that include numerous computing systems and devices that are physically or wirelessly connected. The client and server systems can also be integrated into a single computing device.

Computing Environment

Attention will now be directed to FIG. 1, which illustrates one embodiment of a computing network that includes a client system 110, a server system 120 that are shown to be connected through a network communication link 130. It will be appreciated that his communication link 130 can be any combination of physical and wireless communication links. In some embodiments, the communication link 130 includes at least the Internet.

Both of the client 110 and server systems 120 are shown to include various computing modules. For example, the client system is shown to include a UI module 112, and edit module 114 and a communications module 116, each of which will now be described in more detail.

The UI module 112 is generally configured to interface with network browsers, such as an Internet browser, and to render images, text, menus, windows, and other content at the client system 110 or another corresponding display device (not shown).

In some embodiments, the UI module 112 provides a preview interface (which is described in more detail below) for rendering a preview of a document that is being worked on, through a client browser, and with accurate positioning and formatting. Rendering the preview can include receiving and displaying images of text as well as identifying the positioning and hot zone information that is received in a preview file and for overlaying or merging linked images with the images of text and in the appropriate positioning, as well as the other acts described below.

Rendering of the preview file with the UI module 112 can also include the identification of different types of client display devices and browser display settings and capabilities. The UI module 112 uses this information, for example, to provide the best possible display of the preview file. In some instances, this means the preview file is displayed in the largest possible size while enabling at least one preview page to fit entirely on a screen and without requiring any scrolling to view the contents of that page.

The UI module 112 can also be used to render a table of contents corresponding to the document and in such a way that a user can select and move elements of the table of contents while it is being displayed, such as, for example, with the drag and drop functionality described below.

The edit module 114 provides the appropriate computer-executable instructions for receiving and tracking changes made by a user. This can include identifying a user selection of a particular location or hot zone on a displayed preview or interface window, as well as identifying the text and/or images that correspond to the selected hot zone. The edit module 114 also provides an edit interface window that displays the corresponding text and/or images in an editable format. This is particularly beneficial when the preview interface displays the text and/or images in an un-editable format.

When edits are made to the text and/or images, the edit module communicates the changes to the server through the communications module 116. The communications module 116 also facilitates other communications with the server 120 and remote systems 140 and 150, as well as communication between the various modules 112, 114, 116 and storage 118 of the client.

The client 110 also includes storage 118 for storing the computer-executable instructions that enable the computing functionality implemented by the client as well as the files and content that is used by the client 110. The storage 118 can also store content received from the server, including, but not limited to the preview file, image files, images, and other content received from or referenced by the server 120.

In some instances, for example, the storage 118 includes the client cache for temporarily storing images and other content received from the server or another remote location. This is embodiment is particularly beneficial when the client 110 caches images for a document that is being worked on because the server can provide references or links to the images without having to resend the images as part of the preview file.

It will be appreciated that the client storage 118 can also include non-volatile memory as well as volatile memory, as can the storage 128 of the server and the storage 142 and 152 of the remote or third party systems 140 and 150.

In some embodiments, the remote systems 140 and 150 are distributed components of the client 110 and/or server 120 systems. The remote systems 140 and 150 are third party systems can provide an interface for one or more collaborators to contribute to a personal work. The remote systems 140 and 150 can also comprise proxy servers or repositories for facilitating communication between the client 110 and server 120. The remote systems 140 and 150 can also store and provide images and other content that is referenced by links or identifiers in a preview file, which is either pushed to the client or provided at the request of the client.

The remote systems 140, 150 can include any combination of the modules contained by the client 110 and server 120 systems, including the UI module 112, the edit module 114, the communications module 116 of the client 110, as well as the typeset module 122, storage module 124 and communications module 126 of the server 120.

The modules 122, 124 and 126 of the server will now be described in greater detail. The typeset module 122, for example, is configured with sufficient computer-executable instructions for typesetting and compiling the documents, images and other content in a personal work. The typeset module 122 establishes the fonts, formats and positioning of the corresponding content to be published in a personal work. In some instances, the typeset module 122 contains proprietary or unique fonts and formatting instructions that cannot be easily translated, interpreted or rendered by a browser, such as, for example, by a browser at the client 110 or remote 140, 150 systems.

In existing systems, the personal work generated at a server through an Online publishing service is typically not rendered by a client browser with accurate positioning and font rendering because the client browser will substitute browser identified fonts and formatting for the unidentified fonts and formatting in the original document. The browser will also reposition the text and images to accommodate for the changes in fonts and formatting and to fit within a browser defined page size. The repositioning is particularly noticeable when the original page size is an atypical page size.

To compensate for the foregoing limitations some existing systems compile the entire working file into a single file that is transmitted to the client, for example, as a PDF file or image file. This compiled file includes all of the text and images that are found in the working file. As mentioned above, however, there are many drawbacks to this process. In particular, the file can become too large to transmit or load quickly. The time it takes to edit the file can be significant, particularly considering that the client must iteratively submit changes and wait to receive the entire contents of the compiled preview file each time a change is submitted and to see if the desired result is achieved.

The present invention minimizes some of the problems experienced by existing systems by transmitting a preview file to the user that includes less than the entire contents of the working file. For example, in some embodiments, text files are separated from color image files and other photos included in the personal work. By extracting the color information from the text image information, it is possible to significantly reduce the file sizes being transferred and to reduce the latency experienced by the user of the Online publishing applications. In some instances, the preview file includes less than half of the contents of the working file. In fact, the contents of the preview file may be limited to only a few pages (e.g., one, two or three pages). The preview file can be limited to only the number of pages that are displayed by the preview interface at one time or any other desired quantity of pages.

When additional preview pages are needed, such as during navigation of the displayed preview, additional preview files can be received and processed on demand. If the preview file already included information for the other preview pages being navigated to, they can simply be rendered. New preview files can be transmitted on demand, as the client requests them, or they can be pushed to the client. Pushing the preview files to the client can be advantageous because the client can receive the preview files before they are requested and so that they will be ready when they are needed, without having to wait for them to be transmitted. However, because new preview files pushed to the client may not account for new changes made to existing previewed content, the amount of preview file content pushed to the client can also be limited. When changes are made to the previewed content, such as through the edit interfaces described herein, new preview files are generated and provided to the client to replace previous previewed content that has changed. This may include replacing cached and unprocessed preview files at the client.

In some embodiments, the preview file can also omit selected content from the document, such as figures, images or other content, and even text in some instance. The omitted content is replaced by links or references to the content. For example, a URI, URL or other link can be used. The client can then access the content, as needed from its own storage 118, from the server 120 or any remote system 140 or 150, for example.

According to the present invention, the typeset module 122 prepares the preview file, which can include images of text, links to content, positioning information for positioning the linked content with respect to the images of text, and for positioning the images of text and linked content in the preview interface. Hot zone definitions are also provided which can include positioning information and which further define specific regions on the display preview of the working file.

The hot zones can generally be thought of as bounded areas that are associated with the specific portions of text or images contained within the corresponding hot zone boundaries. Although the boundaries of the hot zones are not necessarily reflected on the interfaces displayed to the user they can be. In other words, the hot zones can be visibly displayed, or invisibly displayed (transparently). The hot zone positioning information can also be tracked and referenced without ever displaying the hot zones, such that when a selection on a display is made, the corresponding hot zone can be identified. In some instances the hot zones correspond to only discrete portions of a page. In other embodiments, a single hot zone corresponds to a plurality of defined areas extending over a single page or multiple pages.

As mentioned above, the edit module 114 can identify a particular hot zone corresponding to a user selection of a particular location on the preview interface, as well as the text and/or images corresponding to the selected hot zone. Typically, although not necessarily, the images and or text associated with a particular hot zone are displayed in an unedited format within the preview interface and can only be edited through a separate interface, such as the edit module 114 interface that is opened in response to user input indicating a user wants to edit particular content of the previewed content.

The typeset module 122 also facilitates the linking and identification of particular sections of the working file with corresponding elements of a table of contents. This linking and identification data can be sent with or separate from the preview file. In some instances, this linking and identification information is never sent to the client 110, but is maintained by the server 120 or a remote system 140, 150.

The storage module 124 contains sufficient computer-executable instructions for enabling collaboration on a personal work from one or more parties, through one or more systems (110, 120, 140 and/or 150), and at one or more disparate times. The storage module 124 tracks and references the working files and coordinates contributions made on the working files. The storage module 124 also tracks and identifies the location of any content contained in the working files, preview files and other referenced content, which can be stored at the server storage 128 or any other storage 118, 142, 152.

The storage module also tracks the associations, identifiers and links described below between the recited elements of the tables of contents and the corresponding content in the documents they reference, such that movement of elements in a table of contents can result in the movement and/or reformatting of the content in the corresponding document.

The last module is the communications module 126 which contains sufficient computer executable instructions for facilitating communication between the server 120, the client 110 and remote systems 140, 150, as well as communication between the various modules 122, 124, 126 and storage 128 of the server.

Contributing, Displaying and Editing

Figure 2:
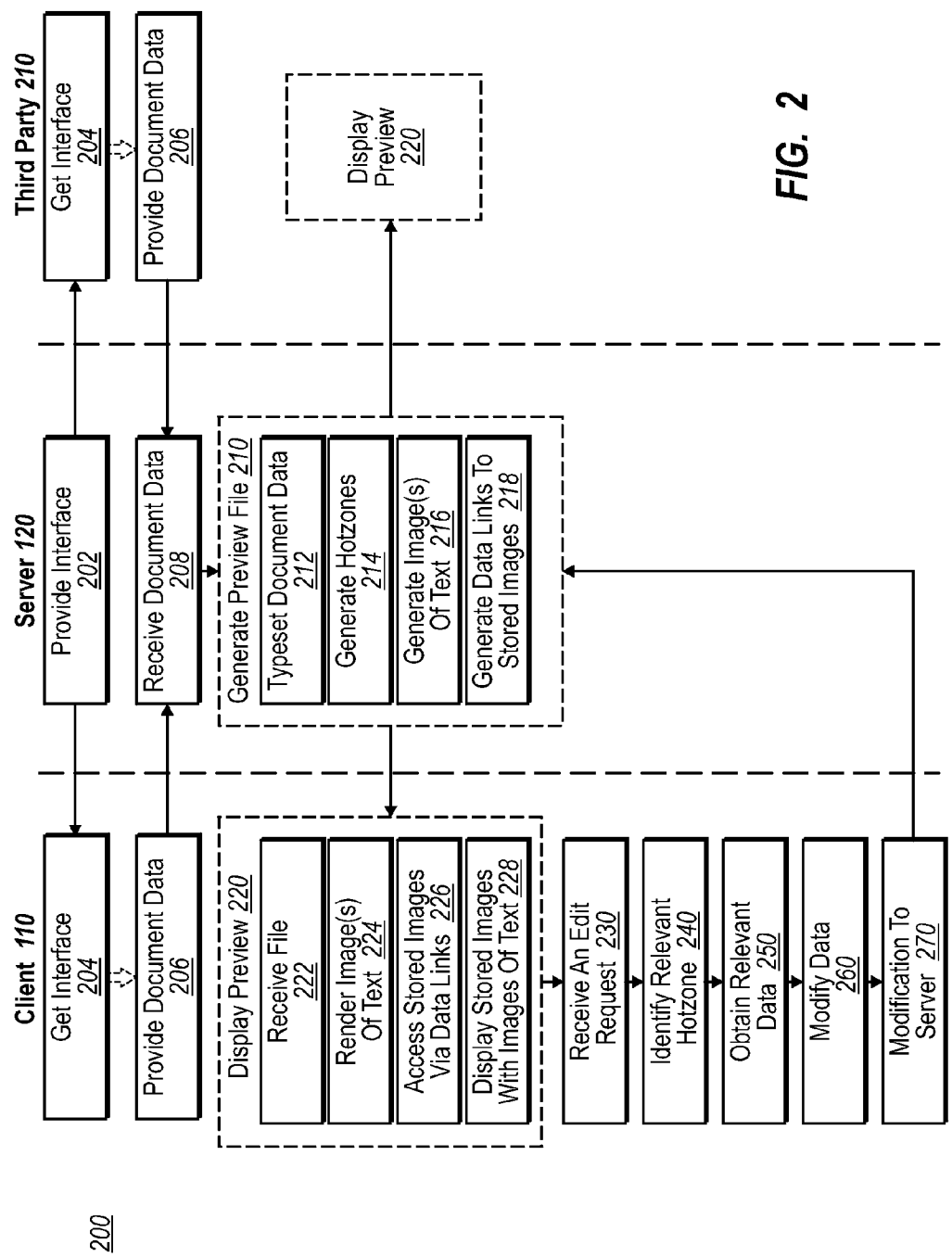
FIG. 2 illustrates one embodiment of a flowchart that includes acts and steps corresponding to communication between the client system and server system for enabling some of the Online publishing embodiments recited in the claims.

Attention will now be directed to FIG. 2 which illustrates a flowchart containing various acts and steps that can be implemented by the client 110, server 120 and third parties 210 to practice aspects of the claimed embodiments.

As shown, the client first obtains an interface (act 204) for providing document data or content (act 206) to the publishing service at the server 120. A third party 210, such as remote systems 140 and 150 can also provide content to the server 120 in a collaborative or independent manner.

Although not necessary, the server may provide applications and interfaces (act 202) to the client 110 and third party 210 for enabling the submission of desired content and for facilitating many of the other Online publishing activities. The client 110 and third party 210 can also submit content to the server 120 and engage in many of the Online publishing activities without receiving any particular interface from the server 210. For example, the client 110 can obtain any necessary programs (e.g., scripts, applets, executables, and so forth) at the server for performing the Online publishing through a different source than the server 120.

Some of the inventive Online publishing activities also do not require any specialized application to be loaded on the client 110. For example, the client 110 and third party 120 can submit content to the server through various media, including a physical disk that is mailed and that is subsequently loaded onto the server. Many of the Online publishing activities can also be hosted on and run from the server 120.

After the server receives the document data (act 208) corresponding to a working file, the server performs the step for generating a preview file (step 210). This step (210) can include any corresponding acts for implementing the functional limitation of generating a preview file that can accurately represent the formatting and presentation of a working file when it is rendered by a browser that does not recognize all of the formatting and font information included in the working file. In some embodiments, the step for generating a preview file (step 210) includes the corresponding acts of typesetting the document data (act 212), generating hot zones (act 214), generating images of text (act 216), and generating data links to stored data (act 218).

The act of typesetting the document (act 212) includes positioning and formatting the document data, including text and images. When the document data includes images, the actual images can be omitted from the preview file and stored in an appropriate storage location, as described above. The images are then referenced in the preview file by data links or other identifiers. In some instances the images are only identified by a simple ID or reference, such as when they are being cached at the client 110. In some instances the preview file also includes location information, such as a URI for enabling the client 110 to locate the images.

Images of the text are also generated (act 216) to preserve the exact font, format and positioning of the text relative to the shape and size of the page(s) and content of the working file that the text is found on, even when the images of text are rendered by a browser. There are various different protocols that can be used to generate images of the text and in various different formats, including, but not limited to JPEG, GIF, PNG and so forth.

Hot zones and positioning information are also generated (act 214) to further define the location where the images should be rendered with regard to the imaged text and with respect to the size and shape of the corresponding page(s). Associations between the hot zones and the content corresponding to the same locations as the hot zones can be explicitly defined in the preview file or it can be omitted and subsequently calculated or inferred by the edit module 114 or another process.

Although the foregoing description of extracting and linking to content is provided with reference to images, it will be appreciated that other types of content can be extracted and/or referenced beyond the simple static images referenced above. For example, when the publication is an electronic publication, it is possible to publish video clips and audio files in addition to static images. Accordingly, the act of generating data links to stored images (act 218) can also include corresponding acts of generating links to stored video clips, audio files and other content, even text, which can all be referenced by the preview file, and in the manner described above, such that they can be replaced in the compiled preview file by identifiers.

While in some embodiments the images are only extracted and linked to after the client first receives the images in a previous preview file or transmission from the server, it is possible to begin extracting and linking to images through the preview file without the server ever sending the images to the client.

Once the preview file is prepared it can be compiled and sent to the client 110 or otherwise made available to the client through a browser-based interface. In some instances, the preview file is prepared on demand and only in response to a user-initiated request for a preview.

In some embodiments, the preview file is also only prepared for an incomplete portion of the working file. Many different preview files can also be prepared and sent to the client for different portions of the working file. The client system can then display, on demand, the relevant preview pages that are desired.

It will be appreciated that by minimizing the amount of content sent in a single preview file and, particularly, by separating black and white text images from the full color photo image files, the transmission of the file is much quicker than would otherwise be possible when sending a compiled file of a larger and entire work, including the color photo images. The reduction in the amount of data having to be collectively processed, typeset and compiled to generate a preview file can also provide significant savings in the processing requirements for the server 120 that is providing the publishing service.

After the preview file is generated (step 210), the client 110 or third party 210 can then display a preview of the working file (step 220), or at least a preview of a limited portion of the working file. This functional step can be performed by implementing the corresponding acts of receiving the preview file (act 222), rendering the text images (act 224), accessing the linked images (act 226) and/or other content, and displaying the linked content with the imaged text (act 228).

With respect to act 226, it will be appreciated that the linked content can be accessed at a remote or local store, including the client's cache. In fact, it is possible for the client to receive the linked content from a remote system without ever receiving anything more than links or references to the extracted content from the server.

As alluded to above, it is possible to render the preview in different display screen sizes, to accommodate for different displays and user preferences. In some instances, the preview file is displayed in the largest possible size while enabling at least one preview page to fit entirely on a screen without requiring any scrolling to view the contents of that page. In other embodiments at least two entire pages are displayed simultaneously in their largest possible size without requiring scrolling to view their contents. To provide the best possible display, the server 120 may identify the client 110 display capabilities so as to provide a preview file that includes positioning and formatting information that will result in the desired display.

Regardless of the displayed preview size, the proportional size, formatting, and position of the content is accurately reflected in the preview. This may require dynamic processing when, for example, the user adjusts the size of the display window/frame. When the user increases or decreases the size of the preview interface window, the size, formatting and position of the content in the displayed preview is correspondingly increased or decreased in size so as to preserve a proportionately accurate representation of the working file in the ready to publish format.

After the preview is displayed, the user may decide to edit the displayed content. The user can indicate that they want to edit the content (act 230) by clicking on a particular word, region, image or portion of the preview. User interface buttons and menu options can also be used to receive an edit request (act 230).

When an edit request is received (act 230), the appropriate system identifies the corresponding hot zone where the edit is requested (act 240). Once the hot zone is identified, the corresponding data (images, text, or other data) is identified (act 250). The correspondingly relevant data can be identified by reviewing explicit associations between the hot zones and corresponding content. In some instances, the relevant data can also be calculated or inferred through the positioning information associated with the hot zones and the positioning information associated with the displayed content. As mentioned above, a single hot zone can correspond to a single defined area, or a plurality of defined areas extending over a single page or multiple pages.

When a selection of content to edit is made, a new user interface feature can be presented to the user, such as, for example, a new interface display window or frame. The new interface feature accesses and renders the actual content to be edited, even though it may not be rendered in the edit interface with the same precision as the preview file with regard to the actual formatting, positioning and font presentations of the actual working file.

The new edit interface provides the user an opportunity to modify the content in an anticipatory fashion (act 260). In other words, changes can be initiated that are anticipated to achieve a desired result, and even though the actual consequences of changes are not certain until the modifications are sent to the server (act 270) and until the working file is typeset with the modifications and a new preview file is generated.

Figure 3:
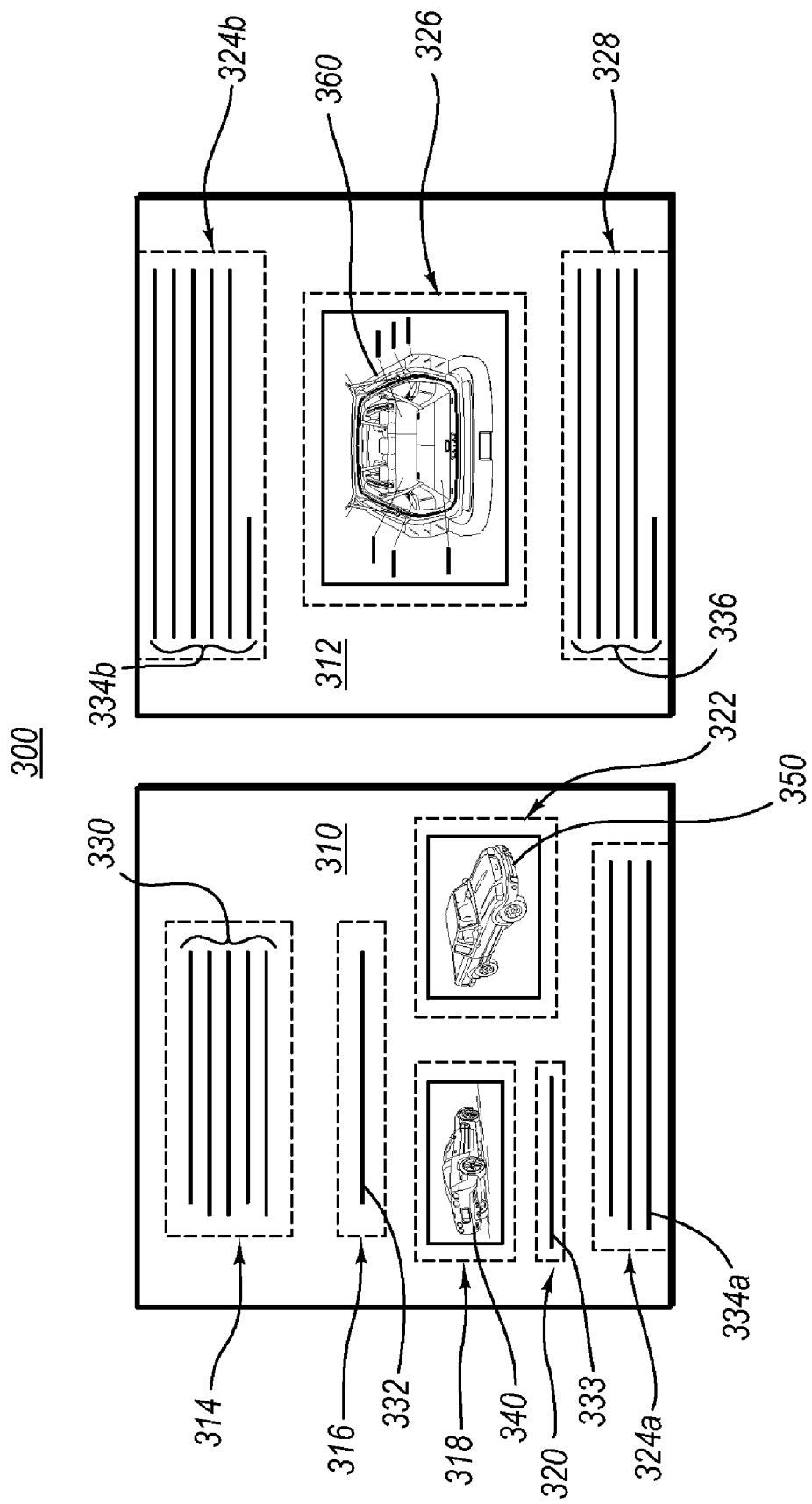
FIG. 3 illustrates one embodiment of a displayed preview of content that includes two pages of a document.

FIG. 3 illustrates one embodiment of a displayed preview 300 that can be displayed, for example, by implementing the acts and steps shown in FIG. 2. Although the preview is shown to include two pages 310 and 312, it will be appreciated the displayed preview can include any number pages or portions of a page to accommodate different needs and preferences. The size of the displayed preview 300 can also vary depending on the instructions contained in the preview file and/or the amount of content the preview file corresponds to. For example, the preview file may only correspond to one or two pages.

In some instances, the displayed preview 300 displays less content and/or fewer pages than the preview file provides for. For example, the preview file may correspond to four or more pages of a working file but the preview interface may be configured to only render two pages at a time. Accordingly, the acts and steps identified in FIG. 2 with regard to displaying the preview (step 220) can certainly be interpreted as an iterative process in which different portions of the preview file are processed, prepared and displayed at different times. Similarly, the acts and steps identified in FIG. 2 can also be interpreted as an iterative process of processing, preparing and displaying a plurality of different preview files.

In the preview 300 shown in FIG. 3, there are various hot zones identified (314, 316, 318, 320, 322, 324a, 324b, 326 and 328). The boundaries of the hot zones are illustrated as dotted lines to indicate that they may be visibly displayed or hidden to the user through the preview interface. The preview 300 also includes various portions of text (330, 332, 333, 334a, 334b, and 336), as well as images (340, 350 and 360), which are bounded by the hot zones (314, 316, 318, 320, 322, 324a, 324b, 326 and 328).

Although FIG. 3 does not provide any image within the same hot zone as a section of text, this is possible. It is also possible to two or more hot zones to overlap, in which case the presentation and edit interfaces will help the user identify the relevant content they want to edit. For example, a user may be provided with options of the different sections of text, images and other content that correspond to a single input, for selection. A user may also be able to toggle between different zones by clicking on the same area repeatedly or by pushing another button or by selecting a menu option.

To further help the user identify a particular zone and corresponding content, the user interface can display the zone boundaries so that the user will be better informed in making their initial selections. However, in some embodiments the hot zone boundaries are hidden so as to provide a preview that is both an accurate and a clean representation of the working file.

Although FIG. 3 shows hot zones corresponding to individually defined areas, a single hot zone can also correspond to a plurality of defined areas extending over a single page or multiple pages, as mentioned above.

FIG. 4 illustrates how changes made to one portion of a document can cause a domino effect. For example, all of the hot zones, images and text of FIG. 4 have been moved from their original positions in FIG. 3 in response to a single passage of text 314 being modified. In particular, a few lines have been added to the text 314, which has pushed the subsequent content down the pages (310 and 312).

The modifications to the text 314 found in hot zone 330 can be performed with an editing process, such as described above, such that the modifications are communicated to the server and used to generate a new preview file, and such that the client generates a new corresponding preview, such as preview 400.

When the new preview file is generated, new hot zone and positioning information is generated to account for the relocation of the various passages of text and images resulting from the modifications to text 314. As shown in FIG. 4, all of the hot zones, images and text have been relocated to accommodate the additional text, except for hot zone 330 and text 314, which simply increased in size. Hot zone 328 and text 336 have also been moved off of the page 312 to another unseen page which can be viewed on demand by generating a preview of data in a received preview file or by accessing a different preview file.

The dynamic change to all of the contents downstream from a modification (and upstream in some instances) can incur a significant processing load on the server if it has to process and compile an entire preview for an entire work, particularly when that work includes a significant volume of data and images. The consequence of such a load is a noticeable latency between the time when the user makes a modification and the time when the user can see a new preview that will reflect the actual results of their anticipated change. The latency also results from having to retransmit a preview file corresponding to an entire work for each modification that is made.

The present invention minimizes many of these problems by generating preview files corresponding to incomplete portions of the entire work and excluding color photo images, as described above. When the user subsequently decides to navigate to other pages than those that are displayed in the preview interface, new preview pages can be rendered on demand.

Table of Contents

Figure 6:
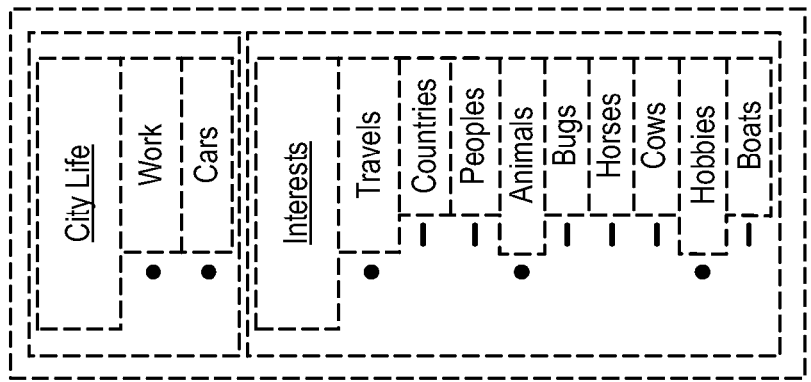
FIG. 6 illustrates one embodiment of the table of contents of FIG. 5 after certain elements of the table of contents have been moved and reformatted.
Figure 5:
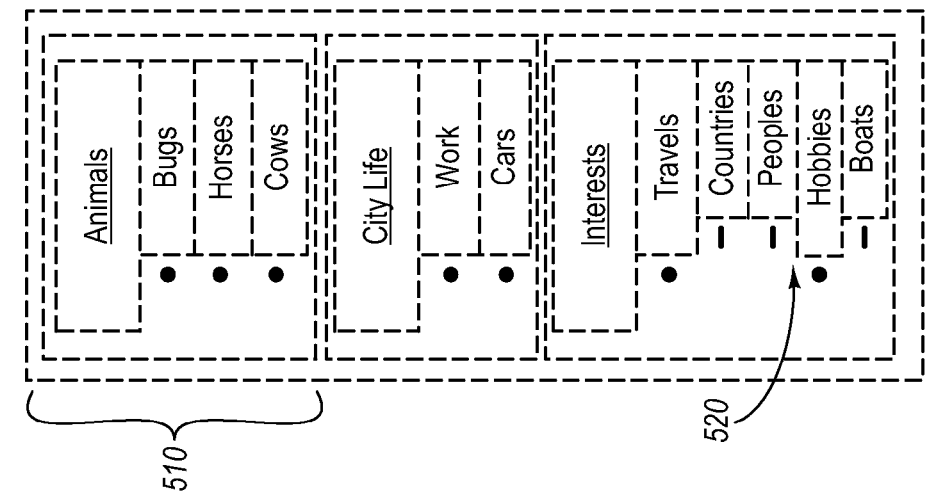
FIG. 5 illustrates one embodiment of a table of contents.

Attention will now be directed to FIGS. 5 and 6, which illustrate two tables of contents 500 and 600. These tables of contents will be referred to during a description of the flowchart 700 shown in FIG. 7, which illustrates several acts that can be implemented to automatically modify a document responsibly to corresponding changes made to a table of contents of the document.

Figure 7:
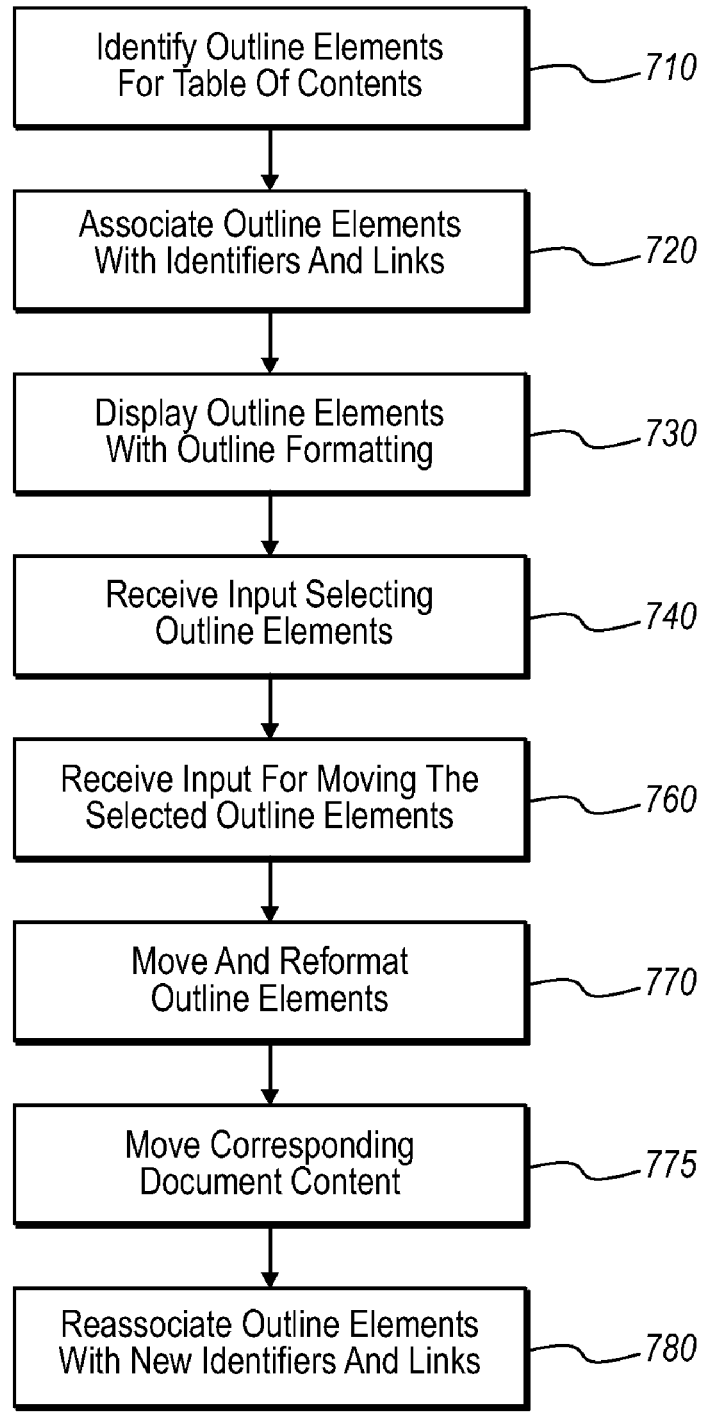
FIG. 7 illustrates one embodiment of a flowchart that includes acts and steps corresponding to moving and reformatting content though a table of contents.

The first act illustrated in FIG. 7 includes identifying outline elements for a table of contents (act 710). This act can be performed automatically, such as, for example, during typesetting of the document or during a separate parsing process in which titles, headings, page numbering, special formatting, and other distinguishing document characteristics are identified. In some instances this is done manually.

Once identified, the elements of a table of contents are associated with specific identifiers (act 720). In some instances the identifiers reflect a tree like hierarchal organization by providing children nodes with an identifier that explicitly or inherently includes the identifiers of any parents. In other instances each identifier is completely unique and agnostic with respect to parents and such that all of the hierarchal relationships are defined by a separate record, such as a table or array.

Links can also be established (act 720) between the table of content elements and the corresponding content in the document. References can, alternatively, be stored in a separate record to preserve the associations between the table of content elements and the corresponding document contents.

The table of contents can be presented to the user (act 730) in response to a specific user request or automatically. For example, the table of contents can automatically be provided with the preview or edit interfaces or at another time.

One novel feature provided by the present invention is the ability to make corresponding changes to the positioning of content in a document automatically and responsively to the modifications made to a corresponding table of contents. In some instances, the modifications made to the table of contents extend beyond changes in positioning. This will be shown with specific reference to the examples of tables of contents 500 and 600 that are shown in FIGS. 5 and 6.

In the example shown in FIG. 5, three main headings are provided, namely, "Animals", "City Life" and "Interests".

The first level headings are formatted with underlining. The second level headings ("bugs, horses, cows, work, cars, travels and hobbies"), are found under the first level headings and have different formatting than the first level headings. In this example, the second level headings are not underlined, are indented further in than the first level headings and are preceded by bullets.

Some third level headings ("countries and peoples") are also shown to have different formatting than either of the first and second level headings. For example, the third level headings are indented more than either of the first or second level headings and they are preceded by a dash.

Notwithstanding the description provided above with regard to particular formatting, it will be appreciated a specific formatting of the table of contents should not be considered a critical feature of the invention. Accordingly, it will be appreciated that the scope of the invention also extends to different formatting for tables of contents and various schemes for defining the hierarchal levels reflected by a table of contents.

After the table of contents is displayed, a user can provide input selecting one or more of the outline elements (740). In some instances the selection of an element can cause the display of the corresponding content in an edit or preview interface. In other embodiments the selection of the element is made to reflect a desired movement of the elements (act 760). For example, in one embodiment a drag and drop type selection and movement of the table of contents elements will result in the selected elements being moved and reformatted (act 770).

The movement and reformatting of the elements (act 770) can be explained more clearly in reference to the changes made between the table of contents shown in FIG. 5 and the table of contents shown in FIG. 6. As shown, a selection of elements 510 is made in FIG. 5 that includes the first level header "Animals" as well as the corresponding second level headers "bugs, horses and cows."

This selection of elements 510 is dragged and dropped between the third level header "peoples" and the second level header "Hobbies" at location 520. The result of this movement is reflected in FIG. 6. As shown, the first level header "Animals" has now become a second level header with formatting consistent with the other second level headers. Similarly, the second level headers "bugs, horses and cows" have become third level headers with formatting consistent with the other third level headers.

As suggested from the foregoing, any change in positioning of the tables of contents elements that is properly identified will result in a corresponding change to the relative position of the content in the respective documents. For example, although it is not shown, the movement of the Animals section from its location in FIG. 5 to the new location shown in FIG. 6 has resulted in a corresponding change in the relative location of the Animals section in the actual document and so that the "Animals section" now falls after the "peoples" third level section and prior to the "Hobbies" second level section. The formatting of the header for the Animals section and the subsequent subsections (bugs, horses, cows) have also been modified in the actual document (in addition to the table of contents) to be consistent with the formatting of other second and third level headers in the document.

The foregoing example should not be viewed as limiting the scope of the invention, however. To the contrary, and as suggested above, the invention can broadly extend to all different types of indexes and tables of contents with different formatting wherein a document is automatically modified through the modification of the table of contents.

The scope of this invention should also not be construed as being limited to modifications made to a single table of contents or a single work. In fact, movement of elements from one table of contents (corresponding to a first document) to a different table of contents (corresponding to a separate document) will result in the corresponding movement of the associated content from the first work to the relative position that is referenced in the second work via the movement of the elements between the two tables of contents.

The references to a section made above can also be interpreted as any quantity or designation of content, including, but not limited to, pages, chapters, paragraphs, sentences, words, books, or any other definable section of content that is referenced by a table of contents.

Additionally, although specific examples have been provided with regard to the Online publishing embodiments described above, the present invention may be embodied in other specific forms without departing from its spirit or essential characteristics. Accordingly, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for submitting content from an online third party source for inclusion in an online publishing document via an online publishing service, the method comprising:
    displaying a first table of contents of an online publishing document within a browser or web enabled application, the online publishing document including one or more sections wherein each of the one or more sections includes content and a heading that represents the content of the section, the first table of contents displaying a listing of the headings of the online publishing document but not the content of the online publishing document represented by the headings of the online publishing document;
    displaying a second table of contents that represents content available from an online third party source, the content from the online third party source being divided into one or more sections wherein each of the one or more sections includes content and a heading that represents the content of the section, the second table of contents displaying a listing of the headings of the content available from the online third party source but not the content of the online third party source represented by the headings of the online third party source;
    receiving input that drags and drops a first heading from the second table of contents to a first location in the first table of contents, the first location representing a second location within the content of the online publishing document;
    identifying the section of content available from the online third party source that the first heading represents;
    incorporating the identified section of content from the online third party source into the online publishing document by:
        inserting the first heading, but not the section of content represented by the first heading, into the first table of contents at the first location; and
        inserting the section of content represented by the first heading into the online publishing document at the second location.

2. A method as recited in claim 1, wherein the method further includes modifying the formatting of the first heading after it is inserted so that it has consistent formatting with other headings in the first table of contents having a similar hierarchal level in the first table of contents.

3. A method as recited in claim 1, wherein insertion of the first heading also causes any other headings in the second table of contents that are hierarchically dependent upon the first heading to also move to the first location in the first table of contents.

4. A method as recited in claim 1, wherein inserting the section of content further comprises modifying the formatting of the inserted section of content so that it has consistent formatting with other sections of content in the online publishing document, including modifying the formatting of a heading of the inserted section of content to be consistent with the headings of other sections of content with the same hierarchical position in the online publishing document.

5. A method as recited in claim 1, further comprising:
    in response to receiving an input that selects a heading in the first table of contents, displaying the corresponding section of content represented by the selected heading in a preview interface that is displayed in conjunction with the online publishing document.

6. One or more non-transitory computer storage media storing computer executable instructions which when executed by a processor perform the method of any of claim 1-4 or 5.

7. A method for automatically modifying content contained in an online publishing document responsive to changes made to a corresponding table of contents of the online publishing document, comprising:
    displaying a table of contents of an online publishing document within a browser or web enabled application, the online publishing document including one or more sections wherein each of the one or more sections includes content and a heading that represents the content of the section, the table of contents displaying a listing of the headings of the online publishing document but not the content of the online publishing document represented by the headings of the online publishing document;
    receiving input that drags and drops a first heading in the table of contents from a first location to a second location within the table of contents;
    identifying the section of content within the online publishing document that the first heading represents;
    rearranging the online publishing document by:
        moving the first heading, but not the section of content represented by the first heading, to the second location in the table of contents; and
        moving the section of content represented by the first heading within the content of the online publishing document to a third location represented by the second location where the first heading was dropped within the table of contents; and
    displaying a second table of contents that represents content available from an online third party source, the content from the online third party source being divided into one or more sections wherein each of the one or more sections includes content and a heading that represents the content of the section, the second table of contents displaying a listing of the headings of the content available from the online third party source but not the content of the online third party source represented by the headings of the online third party source;
    receiving input that drags and drops a second heading from the second table of contents to a fourth location in the first table of contents, the fourth location representing a fifth location within the content of the online publishing document;

identifying the section of content available from the online third party source that the second heading represents;

incorporating the identified section of content from the online third party source into the online publishing document by:

inserting the second heading, but not the section of content represented by the second heading, into the first table of contents at the fourth location; and inserting the section of content represented by the second heading into the online publishing document at the fifth location.

8. The method of claim 7, wherein the method further includes modifying the formatting of the first heading after it is moved so that it has consistent formatting with other headings in the table of contents having a similar hierarchal level in the table of contents.

9. The method of claim 7, wherein movement of the first heading also causes any other headings in the table of contents that are hierarchically dependent upon the first heading to also move from the first location to the second location.

10. The method of claim 7, wherein moving the section of content within the online publishing document further comprises modifying the formatting of the moved section of content so that it has consistent formatting with other sections of content in the online publishing document, including modifying the formatting of a heading within the section of content in the online publishing document to be consistent with headings within other sections of content with the same hierarchical position in the online publishing document.

11. The method of claim 7, further comprising:

in response to receiving an input that selects a heading in the table of contents, displaying the corresponding section of content represented by the selected heading in a preview interface that is displayed in conjunction with the online publishing document.

12. One or more non-transitory computer storage media storing computer executable instructions which when executed by a processor perform the method of any of claim 7-10 or 11.

\* \* \* \* \*